United States Patent [19]

Farrell et al.

[11] Patent Number: 4,702,966
[45] Date of Patent: Oct. 27, 1987

[54] OXYGEN SCAVENGER

[75] Inventors: Christopher J. Farrell, Arlington Heights; Boh C. Tsai, Rolling Meadows, both of Ill.

[73] Assignee: American Can Company, Greenwich, Conn.

[21] Appl. No.: 741,409

[22] Filed: Jun. 5, 1985

Related U.S. Application Data

[62] Division of Ser. No. 228,089, Jan. 23, 1981, Pat. No. 4,536,409.

[51] Int. Cl.$^4$ ............................................. B32B 27/00
[52] U.S. Cl. ..................................... 428/500; 428/913
[58] Field of Search ............ 428/500, 913, 911, 411.1; 426/398

[56] References Cited

U.S. PATENT DOCUMENTS

| | | | |
|---|---|---|---|
| 3,255,020 | 7/1966 | Ferrell | 426/124 |
| 3,419,400 | 12/1968 | Hayhurst | 426/398 |
| 3,429,717 | 2/1969 | Cook et al. | 428/522 |
| 3,670,874 | 6/1972 | Brunner | 426/124 |
| 3,908,070 | 9/1975 | Marzolf | 426/398 |
| 4,041,209 | 8/1977 | Scholle | 428/500 |
| 4,113,652 | 9/1978 | Yoshikawa et al. | 426/398 |
| 4,192,773 | 3/1980 | Yoshikawa et al. | 426/398 |
| 4,254,169 | 3/1981 | Schroeder | 428/516 |
| 4,281,045 | 7/1981 | Sumi et al. | 428/515 |

*Primary Examiner*—Edith Buffalow
*Attorney, Agent, or Firm*—Paul R. Audet; Douglas W. Wyatt

[57] ABSTRACT

This disclosure includes an activatable oxygen scavenger used as a part of a packaging structure for comestibles.

14 Claims, No Drawings

OXYGEN SCAVENGER

This is a Division of application Ser. No. 228,089, U.S. Pat. No. 4,536,409 filed Jan. 23, 1981.

BACKGROUND OF THE INVENTION

This disclosure relates to containers manufactured out of polymeric materials and designed for packing comestibles and the like. More particularly, containers are used to pack foods which have been retort processed for purposes of sterility. A container of this type and method of manufacture are in U.S. Ser. No. 059,374—MULTILAYER CONTAINER AND MAKING OF SAME and U.S. Ser. No. 059,375—APPARATUS FOR MAKING A MULTILAYER INJECTION BLOW MOLDED CONTAINER; those applications are assigned to the same assignee as the present applicaiton.

In the past, multilayer blow molded polymeric containers have been suggested including those with barrier layers to reduce the permeation of oxygen through the wall of the container. The food or beverage packed therewithin is thus protected against oxidation. The recognition of the problem of oxygen permeation is well known and is reduced by a suitable barrier material. Moreover, such materials have been used or suggested in a multilayer construction and have been used in connection with oxygen scavenging systems in order to absorb any oxygen which might pass through the barrier or remain in the head space above the packed and processed food or beverage. More particularly, the prior art Valyi Patent (#4,048,361) discloses a food container formed with a barrier material inside of which is a carrier layer containing a "getter". The getter may be an absorbent for any gas which permeates the barrier layer. An alternate approach of Valyi includes a barrier layer on both sides of the carrier layer whereby oxygen leaving the food or coming from the outside will be slowly absorbed by the getter. The Valyi patent deals in generalities as far as the particular getter and is more specific regarding container shape or construction.

An early patent to Vijlbrief U.S. Pat. No. 3,586,514 discloses the use of antioxidizing agents mixed within the plastic barrier layer to reduce the permeation of oxygen to the beer within such a container.

The Cook U.S. Pat. No. 3,429,717 discloses a barrier of Saran ® in a film sandwich with an antioxidant uniformly distributed between the layers of Saran ®. The antioxidant selected for use by Cook depends upon the film as well as the product to be contained and the light and heat condition to which the package will be exposed.

Yoshikawa teaches in U.S. Pat. No. 4,113,652 that the amount of ammonium salts or water in an oxygen scavenger can lengthen the period before the oxygen scavenger becomes effective. That is to say that, the addition of more water or ammonium salts to the oxygen scavenger will extend the period of latency. Yoskikawa only teaches a period of latency up to twenty hours. As will be appreciated when the thrust of the present disclosure is fully understood, such a latent period is impractical from the standpoint of commercial reality for a food container.

Various oxygen scavengers are also known in the art. An early teaching is the Loo et al U.S. Pat. No. 2,825,651; the oxygen remover system includes hydrates. For example, an anhydrous sodium sulfite catalyzed by copper sulfate pentahydrate. Such an oxygen remover is included as a pellet inside of a protective package and is placed in the container head space. The problem of practicing the Loo et al patent are pointed out in the Yoshikawa patent.

More germane to multilayer containers is the Scholle U.S. Pat. No. 4,041,209 which discloses an aqueous solution of a reducing sulfite salt disposed between a high barrier outer layer and a low barrier inner layer thus permitting the oxygen to permeate outward from the head space but retarding oxygen flow from outside inward. However, an oxygen scavenger system must remain passive or inert in order to preserve its oxygen scavenging capacity until such time as the food is sealed within the container. Many times a container may sit empty in a warehouse for several months before it is used. None of the prior art containers and oxygen scavenging systems disclose a means by which the passivity of the scavenger contained in a multilayer container will be maintained until such time as the oxygen scavenger is most beneficial.

OBJECTS OF THE INVENTION

It is, therefore, an object of this invention to show a technique whereby an oxygen scavenger can be included in a multilayer construction in which the scavenger remains passive until such time as it is needed.

It is a further object of this invention to disclose an oxygen scavenger which can be successfully activated by a simple and convenient method at the precise moment when its greatest need begins.

It is a further object of this invention to present a simple low cost reliable container construction which includes an oxygen scavenger in combination with polymeric materials which are positioned and selected for maximum usefulness and minimum usage in a multilayer combination.

SUMMARY OF THE DISCLOSURE

A multilayer wall construction for a polymeric container to be used to pack comestibles can be constructed with a plurality of layers each of which is selected to perform particular functions. The outer and inner layers are usually structural and protective layers selected to exclude the outside elements and contain the packed comestibles respectively. Between outer and inner layers are materials designed to control the unwanted permeation of oxygen. For example, the outermost layer which is designed to impart structural integrity to the construction, can be an olefinic thermoplastic material for low cost, easy formability and physical characteristics. Similarly, the innermost layer is also structural and can likewise be fashioned from materials that are compatible with comestibles and are low in cost and easily formed.

In between the two structural layers, it is useful to interpose an oxygen barrier thermoplastic layer, such materials, for example, may include ethylene vinyl alcohol co-polymers, such as EVAL ® produced by Kuraray of Osaka, Japan, Saran ® and the like materials having low permeability with respect to the transmission of oxygen. It is advantageous to sandwich the barrier layer between a pair of outer and inner protective layers to provide a combination of packaging properties. Between the sandwiching layers and the barrier an adhesive material can be included to assure the integrity between the outer and inner layers and the inbetween oxygen barrier layer.

To ensure low oxygen transmission by a moisture sensitive barrier layer, drying agents can be used as disclosed in pending application U.S. Ser. No. 101,703 filed Dec. 10, 1979 which is assigned to the same Company as the present assignee. That particular disclosure relates to the desired need to absorb moisture which may permeate through to the oxygen barrier under certain conditions during the warehousing, packing and sterilization processes and the subsequent storage of the container filled with comestibles. Under certain circumstances of high humidity the same oxygen barrier may lose its high resistance to permeation and the benefits of an oxygen barrier would otherwise be reduced.

It is recognized that comestibles packed in containers by conventional methods with a hermetic double seamed end will include a certain amount of head space gases and entrained oxygen. Oxygen in the head space gases will react with some comestibles. Although it is desirable to keep the head space gases to a minimum to provide reliable end closure with hermetic seals it is also important to minimize the amount or oxygen which can react with the contents in the container. Oxygen permeation into plastic containers is an additional concern not present with metal cans. Thus, an oxygen absorbing system to protect the comestibles may be required, especially for a plastic container.

Minimizing oxidation of the comestibles will help to prevent product degradation. Changes in color, nutritive value and flavor may be associated directly with degradation due to oxygen combining with the comestibles. In a multilayer plastic container a system to absorb oxygen is of extreme importance because even an excellent oxygen barrier only reduces the permeation of the oxygen. A system which will absorb oxygen that permeates the barrier, and which is located between the barrier and the comestible is desirable. More particularly, an oxygen absorption system with a greater affinity for oxygen than the comestibles is desirable. Ideally, such a system should be capable of absorbing oxygen faster than the comestibles as well as having a stronger affinity for oxygen than the comestibles.

It is also essential that the oxygen absorption system is not activated before the comestibles are packed. The container should be capable of manufacture and subsequent warehouse storage with the oxygen absorbing system in a passive state until the precise time at which the oxygen absorption is required, at which time such a system may be activated. Without a triggerable absorption system having passive and active states, severe depletion of usefulness could occur during empty storage prior to packing. The benefit of any absorption system without triggering is limited to prompt use of the container immediately after manufacture. Such a limitation is impractical in connection with commercial use and procedures for hermetically packaging of comestibles.

An oxygen absorption system with a controllable chemical behavior is desirable and may include a palladium catalyst to combine hydrogen and oxygen in the container to form water. U.S. Pat. No. 4,125,632 discloses that type of system which is triggered by flushing of the container with a gas mixture including hydrogen. That process is expensive due to the palladium and the extra process step.

The present invention seeks to employ the commonly used filling and process equipment and the normal retort operation to provide an oxygen absorption system that can be triggered by the sterilization procedures used during packing and processing. More particularly, the triggering mechanism here includes a system which is activated by the ingress of moisture through the walls of the multilayer polymeric container. This ingress may occur during packaging, processing or sterilization of the container. The increased temperature during packing or sterilization is a secondary variable which speeds up the permeation of water into the oxygen absorber to activate it. More specifically, the oxygen absorber when dry is passive but upon moisture application resulting from normal processing it becomes activated and begins to react with oxygen.

In the past antioxidants have been added to polymeric resins to be formed into containers and to the materials contained within to inhibit their oxidation. It is also known that certain antioxidants also have an ability to react with oxygen but usually to a very limited extent. The differences between direct oxygen absorption and the action of typical antioxidants is relevant to the present invention which seeks to use a direct oxygen absorber in contrast to the earlier work which used antioxidants such as propyl gallate, butylated hydroxyanisole, di-tertiary-butylparacresol (see Valyi U.S. Pat. No. #4,048,361 . It is important to appreciate that the typical antioxidant operates in a manner different from direct oxygen absorbers. More specifically, antioxidants are usually used in small percentages to terminate the degradation process of the material into which it is mixed i.e., the plastic package itself or the contents. A direct oxygen absorber as used in this invention is capable of reacting with a much larger amount of oxygen than antioxidants would and is also employed at relatively large concentrations. The chemical distinction is that oxygen absorbers react chemically only with oxygen. While antioxidants may react with molecular oxygen their primary action is to interfere with the free-radical chemistry involved in oxidative degradation.

The concept of triggering is appreciated only in part by the Musher U.S. Pat. 2,316,804 where materials which do not have antioxidant activity when initially applied can, in the presence of elevated temperatures and organic packaging compositions, develop marked oxygen scavenging effects. These materials are inappropriate for containers formed by melt extrusion, since the high temperatures of manufacture would activate the oxygen absorption prematurely.

As disclosed, the preferred embodiment consists of five layers of thermoplastic material, the outer and inner being polyolefinic or olefinic and the buried layer being an oxygen barrier layer. Between the barrier and olefin layers are adhesive layers to assure structure integrity. Either or both adhesive layers may include an oxygen absorbing system. Locating the oxygen absorbing system between the oxygen barrier and the comestible is preferred. A number of such systems could be used in the adhesive. The selection of the system is dependent upon the particular process conditions for the container and the amount of oxygen absorption desired.

The multilayer container has olefinic outer and inner layers which are resistant to the transmission of water vapor at room temperature, but at elevated temperature, during retorting they permit water vapor to permeate into the oxygen absorbing system. It is the water vapor which is the triggering agent.

Much of the recent prior art discloses systems for use in a package to be included within the container for reacting in the presence of the moisture in the food, see, for example, German Offenlegungsschrift No. 28 27 247 published Jan. 4, 1979. These disclosures recognize the potential for oxygen absorption use by a sulfite salt that is wet. However, the water is introduced by either using the hydrated form of the salt or by coming in contact with the water carried in the food. There is no specific teaching of triggering by the controlled application of the water to activate the oxygen absorber, or any appreciation of the discovery that the water vapor permeability of a container wall protecting the sulfite salt can become 1,000 times greater by raising its temperature from 70° to 250° F. as is the situation when polyethylene and polypropylene are used as the inner and outer layers, nor do they teach that other temperature ranges or process conditions will achieve triggering with other structural layer resins.

The structures of the present invention contain compositions which become oxygenphilic and react with oxygen when they have dissolved by absorbing permeated water vapor. Some watersoluble salts can become highly oxygenphilic in this deliquescent state. A deliquescent state as used herein refers to chemicals which are either in the process of dissolving or have dissolved, by absorption of moisture vapor. While almost all inorganic salts will deliquesce when the humidity approaches 100%, this invention is best practiced with chemicals (called deliquescent salts) which deliquesce at lower humidities, i.e. below about 85%.

A deliquescent composition consists of at least one deliquescent salt and one material which absorbs oxygen when wetted. The two functions may be combined in the same salt, such as in the case of potassium sulfite or be separate, as in an interacting mixture of potassium acetate and sodium sulfite. A dry composition in the container wall can come to a deliquescent state when water vapor permeates through during the retort. Afterwards the moisture is trapped by the walls as they cool because their ability to transmit moisture reduces again by a thousand fold. The triggering is, therefore, accomplished by this combination.

Potassium sulfite is an excellent material to use as an oxygen absorber because it is a deliquescent salt and is only oxygenphilic in the wet state. As such it is excellent in achieving the purposes of this invention. Potassium sulfite may be used alone or with other deliquescent salts; especially those which deliquesce at lower relative humidities to influence the triggering time. The status of potassium sulfite for use in connection with food containers is also excellent from the FDA standpoint as potassium sulfite is an approved food additive.

DETAILED DESCRIPTION OF THE INVENTION

The invention can be practiced by manufacturing multilayer polymeric containers as set forth by injection or extrusion molding techniques or by thermoforming. Such plastic multilayer containers can then be sold to food and beverage packers without concern that the oxygen absorption system will be depleted during the time between manufacture and use. More specifically, the preferred system has the olefinic layer protecting the oxygen absorber from moisture so that it will not become highly oxygenphilic until it is retort processed. Packing a wet comestible in a container of the preferred construction and design will result in a gradual triggering of the oxygen absorption system. Potassium sulfite is particularly well suited for use as an oxygen scavenger because it can be readily triggered by the retort process and has enough thermal stability to permit its use in thermoplastic processes such as injection molding.

To test the triggering mechanism for oxygen absorption a number of square plaques having five layers were assembled. The outer layers were cut from a 15 mil thick polyolefin sheet which was a 50:50 melt blend of polyethylene and polypropylene. The central layer was a 2 mil sheet of ethylene vinyl alcohol co-polymer (GLD; as sold by Nippon Goshei Co., Ltd., Japan). The interleaving adhesive layers were a modified polyolefin (Plexar; as sold by Chemplex Inc., Rolling Meadows, Ill.) into which was melt compounded finely divided potassium sulfite at a loading of 20% by weight. These adhesive sheets were about 2 mil thick. The separate layers were stacked and then melt-pressed together to form an integral plaque in which the outer olefin sheets come together only at the edges to completely protect the innermost layers from ambient moisture. A further set of plaques were made in which di-sodium phosphate was substituted for potassium sulfite in the adhesive layer. Because di-sodium phosphate does not absorb oxygen these were used as a control.

These plaques were autoclaved at 250° F. for different periods of time and were then analyzed on a MoCon oxygen permeability tester. In this instrument both sides of the plaques can be purged with nitrogen gas. The gas stream from the lower side is passed over an oxygen detector. Under perfect conditions the reading from this detector should be zero; in practice leaks cause a small reading, known as the baseline. Plaques which contain an active oxygen scavenger depress the baseline because the leaked oxygen is absorbed. This technique can be used to identify those plaques which are absorbing oxygen. Table 1 compares values obtained under nitrogen gas purge for unretorted and retorted plaques.

TABLE 1

| AGENT IN ADHESIVE LAYER | $K_2SO_3$ | | | | | | | | $Na_2HPO_4$ | |
|---|---|---|---|---|---|---|---|---|---|---|
| Autoclaving time (mins) | 0 | 0 | 30 | 30 | 45 | 45 | 60 | 60 | 120 | 120 |
| Baseline reading (mV) | .03 | .03 | .02 | .03 | .02 | .02 | .02 | .02 | .03 | .03 |

The results indicate that 30 minutes autoclaving is the borderline requirement to start the oxygen absorption with this composition while autoclaving for 45 minutes triggers it.

For further testing, cylindrical-sided containers were thermoformed from multilayer co-extruded sheet. These containers had a diameter of 4 1/16" and a depth of 4 7/16". The body of the container consisted of six layers. The oxygen scavenger $K_2SO_3$ was mixed in a carrier material high density polyethylene (HDPE) which was placed next to the inner polyolefin (50:50 melt blend of high density polyethylene [HDPE] and polypropylene [PP])structural layer. Specifically, the layer composition of the container from the inner surface to the outer surface was as follows: 12 mil HDPE-PP/4 mil HDPE with 30% (by weight) $K_2SO_3$ mil Plexar/2 mil EVAL/1 mil Plexar/12 mil HDPE-PP blend. EVAL is an ethylene vinyl alcohol co-polymer made by Kuraray Chemical Co., Ltd., Japan. A group of five layer containers without $K_2SO_3$ were als included as the control. The layer composition was: 15 mil HDPEPP/1 mil Plexar/2 mil EVAL/1 mil Plexar/15 mil HDPE-PP. The cans were filled with hot (160° F.) water and double seamed with metal lids containing two small rubber grommets. The head space between water in the can and the lid was approximately 6/32 inch high.

At given storage times after retorting (at 250° F.) or hot filling (at 160° F. a sample of head space gas was extracted through a grommet and analyzed for oxygen and nitrogen using gas chromatography. The oxygen concentrations in the head space (measured as a ratio of oxygen to oxygen plus nitrogen) are shown in Table 2. The concentration in the hot-filled but unautoclaved container is less than that of air (0.21) because, as the hot water cools, its increased affinity for oxygen lowers the $O_2$ concentration in the head space.

Thus, it is clear that the autoclaved containers are triggered to absorb oxygen since their oxygen level decreases while that of the unautoclaved container is steady with time. This further demonstrates the efficacy of the system for triggered oxygen absorption.

TABLE 2*

| PROCESS | OXYGEN ABSORBING AGENT | STORAGE TIME, DAYS | | | | | | | | | | |
|---|---|---|---|---|---|---|---|---|---|---|---|---|
| | | .02 | .04 | .75 | 1 | 3 | 5 | 6 | 10 | 14 | 18 | 20 | 28 |
| Hot fill | None | | | | .19 | | | .18 | | .18 | | | .18 |
| Hot fill | $K_2SO_3$ | | | .2 | | | | .19 | | .19 | | | .18 |
| Autoclave, 30 Min | $K_2SO_3$ | | .18 | | .15 | | | .13 | | .08 | | .06 | .05 |
| Autoclave, 2 hr | $K_2SO_3$ | .165 | | | | | .11 | .08 | | .045 | | .022 | |

*The numbers in the Table are oxygen concentrations in the head spaces.

TABLE 2A

| | $O_2$ CONTENT - cm$^3$ | |
|---|---|---|
| | Initial | 3 months |
| No additives | 10 | 34 |
| $K_2SO_3$ | 11 | 8 |

Table 2A shows data accumulated over a three-month period The containers were retorted at 250° F. for two hours. As shown in Table 2 the containers with $K_2SO_3$ had been packed and retort processed with water and stored for eighteen days. After this they were emptied and filled with 10 cc of water to maintain 100% relative humidity inside the container. The head space above the water was filled with about 99% nitrogen and 1% oxygen. These filled and sealed containers were stored in an environment with 100% oxygen at atmospheric pressure and 75% RH for 3 months. The container without additives had the same processing and storage conditions. From Table 2A it is apparent that the scavenger containers not only prevented permeation but also absorbed 3 cc of oxygen from the head space. The container without scavenger permeated 24 cc into the container. Though the additive $K_2SO_3$ can also serve as a drying agent to protect the moisture sensitive barrier layer EVAL, the decrease of oxygen concentration in the head space over the three month period conclusively demonstrates the scavenging effect of $K_2SO_3$.

While the containers described above have six layers, a preferred method could have less layers. For example, a five layer construction wherein the potassium sulfite has been mixed into the adhesive. This system shows a prolonged passive state which, by its deliquescent nature, steps abruptly into its active oxygenphilic state. Other systems which have a less prolonged passive state can also be exploited if processing can be made to trigger a large change in the activity of the oxygenphilic state.

Such a system which after triggering by water is an effective oxygen scavenger is a mixture of a heat treated gelatin and a strong alkali. Ordinarily, gelatin will not scavenge oxygen, but it will do so after a heat treatment, either alone or in the presence of the alkali (over 300° F.) for more than 5 mins The following examples illustrate the effectiveness of this system. The composition used as the examples is 10% (by weight) Type A gelatin and 20% (by weight) NaOH in a 70% (by weight) carrier, Plexar ® The said composition was blended together in a Brabender mixing head at 400° F. for 20 minutes, and then pressed into approximately 2 mil thick films.

The film is capable of rapidly scavenging 170 cc oxygen per gram of gelatin when the film is saturated with moisture. One of the conditions adequate for saturating said composition with mosture is to retort the bare film at 250° F. for 2 hours.

The oxygen scavenging rate is extremely slow if the film of said composition is protected by a moisture barrier to reduce moisture penetration into the said composition. The following table illustrates the unretorted oxygen scavenging rate of the film of said composition protected by a 15 mil HDPE layer (moisture barrier layer) on both sides.

TABLE 3

| cc $O_2$ Scavenged per gram of gelatin (73° F.) | | | |
|---|---|---|---|
| | Storage Time | | |
| Storage RH | 37 Days | 58 Days | 108 Days |
| 44% | 0 | 6 | 8 |
| 75% | 0 | 10 | 41 |
| 100% | 9 | 24 | 61 |

It is apparent that the $O_2$ scavenging rate of the said composition can be controlled by the moisture protective layer and the storage conditions. Absorption will take place after the materials are exposed to moist air for prolonged periods of time. This shows that while retorting gives an immediate triggering, it is also possible to obtain triggering without retorting.

The gelatin containing system is effective as an oxygen scavenger but produces unpleasant odors when exposed to elevated temperatures for prolonged periods of time. Where containers are to be made by melt processing plastics (containing the oxygen scavenger systems), it is preferred to use a thermally stable system such as potassium sulfite as the oxygen scavenger.

The constructions described above have had the oxygen barrier layer near the center of the wall, flanked on either side by a structural (polyolefin) layer. There are alternative constructions which will perform satisfactorily and are within the framework of this approach. For example, a multilayer structure with thin layers of an oxygen barrier on the outside. The bulk of the sidewall would be a structural plastic in which an oxygen scavenger is embedded. The structural layer serves as the means to protect the oxygen scavenger lying in the interior of the structural layer from premature triggering, though a fractional amount of the oxygen scavenger near the surface of the structural layer may be triggered before product is packaged. Such a package could be made with a polyolefin wall containing a potassium sulfite dispersion and a Saran ® or epoxy coating on the outside of the can. Although outer oxygen barrier layers are preferred they can be omitted or replaced by pure polyolefin. In this case more scavenger would need to be embedded in the central layer. Finally, a chip instead of a pellet or package of powder, could be used by placing it within a sealed container. An advantage of integral constructions is to prevent the problem of packages of dry powder opening and contaminating the packed product. The chip could be of any of the recited constructions, the choice depending on the application. For example, the chip may be polymeric material having distributed therethrough a composition which when dry is passive and will not absorb oxygen and which when moist is active and becomes oxygenphilic. The chip may be included within a package to selectively absorb oxygen from within the package.

While a preferred system has been shown and described it should be appreciated by those familiar with the arts involved that there are many other deliquescent compositions and polymeric materials which will when used in combination provide the requisite triggering ability to permit the successful application of this material to a package for the commercial processing of comestibles. It is, therefore, desired that the claims that follow are broadly construed to cover any combination that will operate in the manner taught by the foregoing disclosure.

What is claimed is:

1. An article comprised of polymeric protective material having incorporated therein a dry oxygen scavenger material, the oxygen scavenger material being capable of a passive state for prolonged periods of time during which the oxygen scavenger will not directly react with oxygen, and triggerable to an active state when wetted with water which has selectively permeated the protective material from outside the article, whereupon the oxygen scavenger will directly react with oxygen, wherein said protective material is substantially resistant to permeation by water at ambient temperature and has enhanced transmission of water at elevated temperatures and therefore is selectively capable of permeation by water at elevated temperatures to thereby selectively permit the water to contact said oxygen scavenger material to convert it from the passive to the active state.

2. The article of claim 1 wherein said oxygen scavenger material is an alkali and a gelatin and said gelatin has been heat treated with or without said alkali.

3. The article of claim 2 wherein said heat treatment consists of raising the temperature of said gelatin to greater than 300° F. for more than 5 minutes.

4. The article of claim 2 wherein said heat treatment consists of raising the temperature of said oxygen scavenger material to greater than 300° F. for more than 5 minutes.

5. The article of claim 2 wherein said alkali is sodium hydroxide.

6. The article of claim 1 wherein the oxygen scavenger material is adapted to be triggered by water at an elevated temperature during retorting.

7. The article of claim 1 wherein the dry oxygen scavenger material is a singular material.

8. The article of claim 1 wherein the oxygen scavenger material is incapable of self-generating water and is triggerable without the action of any other material in the laminate.

9. The article of claim 1 wherein the oxygen scavenger material is a sulfite salt.

10. The article of claim 9 wherein said salt is potassium sulfite.

11. The article of claim 1 wherein said polymeric protective material is olefinic.

12. The article of claim 11 wherein said olefinic material is a melt blend of polyethylene and polypropylene.

13. The article of claim 12 wherein said polyethylene and polypropylene are in substantially equal proportions.

14. The article of claim 1 wherein the article is selected from the group consisting of a single layer structure, a chip, pellet, sheet, or film.

* * * * *